United States Patent
Lee

(10) Patent No.: US 11,742,535 B2
(45) Date of Patent: Aug. 29, 2023

(54) ENERGY STORAGE SYSTEM HAVING STRUCTURE IN WHICH COOLANT CAN BE FED INTO BATTERY MODULE

(71) Applicant: LG CHEM, LTD., Seoul (KR)

(72) Inventor: Jin-Kyu Lee, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 128 days.

(21) Appl. No.: 17/042,776

(22) PCT Filed: Feb. 11, 2020

(86) PCT No.: PCT/KR2020/001907
§ 371 (c)(1),
(2) Date: Sep. 28, 2020

(87) PCT Pub. No.: WO2020/166940
PCT Pub. Date: Aug. 20, 2020

(65) Prior Publication Data
US 2021/0021002 A1    Jan. 21, 2021

(30) Foreign Application Priority Data
Feb. 11, 2019 (KR) .................. 10-2019-0015685

(51) Int. Cl.
*H01M 10/613* (2014.01)
*H01M 10/63* (2014.01)
(Continued)

(52) U.S. Cl.
CPC ......... *H01M 10/613* (2015.04); *H01M 10/48* (2013.01); *H01M 10/482* (2013.01);
(Continued)

(58) Field of Classification Search
CPC ............... H01M 10/613; H01M 10/63; H01M 10/6567; H01M 10/482; H01M 50/3425
See application file for complete search history.

(56) References Cited

U.S. PATENT DOCUMENTS

| | | | |
|---|---|---|---|
| 2007/0031728 A1* | 2/2007 | Lee ................... | H01M 10/6557 |
| | | | 429/120 |
| 2009/0220851 A1 | 9/2009 | Nakazawa et al. | |

(Continued)

FOREIGN PATENT DOCUMENTS

| | | | | |
|---|---|---|---|---|
| CN | 103481768 A | * | 1/2014 | ......... B60H 1/00278 |
| EP | 2 797 158 A1 | | 10/2014 | |

(Continued)

OTHER PUBLICATIONS

Websealinc; "https://websealinc.com/technical-info/o-ring-temperature-guide/"; Dec. 13, 2022 (Year: 2022).*

(Continued)

*Primary Examiner* — Jimmy Vo
(74) *Attorney, Agent, or Firm* — Birch, Stewart, Kolasch & Birch, LLP

(57) ABSTRACT

An energy storage system includes a module stack having a plurality of battery modules stacked vertically; a venting detecting unit configured to detect a venting when the venting occurs in at least a part of the plurality of battery modules; and a coolant supplying unit configured to supply a coolant to a battery module at which a venting occurs when the venting of the battery module is detected by the venting detecting unit.

17 Claims, 5 Drawing Sheets

(51) Int. Cl.
    *H01M 10/6567* (2014.01)
    *H01M 50/342* (2021.01)
    *H01M 10/48* (2006.01)
    *H01M 50/211* (2021.01)

(52) U.S. Cl.
    CPC ....... *H01M 10/63* (2015.04); *H01M 10/6567* (2015.04); *H01M 50/211* (2021.01); *H01M 50/3425* (2021.01)

(56) References Cited

U.S. PATENT DOCUMENTS

| | | | |
|---|---|---|---|
| 2011/0189511 A1 | 8/2011 | Yoon | |
| 2015/0064514 A1* | 3/2015 | Wu | H01M 50/20 429/120 |
| 2016/0308182 A1 | 10/2016 | Kim | |
| 2019/0077275 A1 | 3/2019 | Capati et al. | |
| 2019/0157636 A1* | 5/2019 | Miler | H01M 50/20 |
| 2021/0036283 A1 | 2/2021 | Børsheim et al. | |

FOREIGN PATENT DOCUMENTS

| | | |
|---|---|---|
| JP | 2010-192209 A | 9/2010 |
| JP | 2011-171052 A | 9/2011 |
| JP | 2011-171245 A | 9/2011 |
| JP | 2015-220176 A | 12/2015 |
| JP | 2015-220177 A | 12/2015 |
| KR | 10-2011-0090236 A | 8/2011 |
| KR | 10-2014-0012244 A | 2/2014 |
| KR | 10-1451873 B1 | 10/2014 |
| KR | 10-2016-0123816 A | 10/2016 |
| KR | 10-1902483 B1 | 10/2018 |
| WO | WO 2007/039999 A1 | 4/2007 |

OTHER PUBLICATIONS

Supplementary European Search Report dated Sep. 3, 2021 in Application No. 20756532.
International Search Report for PCT/KR2020/001907 (PCT/ISA/210) dated May 25, 2020.

* cited by examiner

ENERGY STORAGE SYSTEM HAVING STRUCTURE IN WHICH COOLANT CAN BE FED INTO BATTERY MODULE

TECHNICAL FIELD

The present disclosure relates to an energy storage system having a structure for putting a coolant into a battery module, and more particularly, to an energy storage system for detecting gas generated due to abnormal heating in some battery modules and putting a coolant in to the corresponding battery modules so that a thermal runaway phenomenon does not propagate to other battery modules.

The present application claims priority to Korean Patent Application No. 10-2019-0015685 filed on Feb. 11, 2019 in the Republic of Korea, the disclosures of which are incorporated herein by reference.

BACKGROUND ART

Generally, a battery module includes a cooling system to prevent the life of the battery module from being rapidly shortened due to temperature when used for a long time. The cooling system is designed in consideration of a heat generation amount or the like according to the environment in which the battery module is used.

However, while the battery module is being used, if some battery cells show abnormal heat generation due to failure of some battery cells, the temperature may continue to rise. In this case, if the temperature exceeds a critical temperature, a thermal runaway phenomenon may occur, which may arise safe issues.

That is, if the thermal runaway phenomenon generated in some battery cells propagates to adjacent battery cells within a short time, the temperature of the entire battery module increases rapidly, which leads to an increase in the temperature of the energy storage system including a plurality of battery modules and thus seriously damages property and human life.

Thus, in order to prevent the rapid propagation of the thermal runaway phenomenon, it is required to develop an energy storage system having a structure for quickly detecting that an abnormal heat is generated in some battery modules and intensively putting a coolant into the battery modules in which the abnormal heat is generated.

DISCLOSURE

Technical Problem

The present disclosure is designed to solve the problems of the related art, and therefore the present disclosure is directed to providing an energy storage system having a structure for quickly detecting that an abnormal heat is generated in some battery modules and intensively putting a coolant into the battery modules in which the abnormal heat is generated.

However, the technical problem to be solved by the present disclosure is not limited to the above, and other objects not mentioned herein will be understood from the following description by those skilled in the art.

Technical Solution

In one aspect of the present disclosure, there is provided an energy storage system, comprising: a module stack having a plurality of battery modules stacked vertically; a venting detector configured to detect a venting when the venting occurs in at least one of the plurality of battery modules; and a coolant supplier configured to supply a coolant to the at least one battery module at which the venting occurs when the venting of the battery module is detected by the venting detector.

The venting detector may be provided inside the coolant supplier.

The Each of the plurality of battery modules may include a plurality of battery cells; and a module case configured to accommodate the plurality of battery cells.

The module case may have a vent that is ruptured according to an increase of an internal pressure of the battery module to discharge an internal gas.

The vent may be a resin film that is melted at a reference temperature or above.

The energy storage system may further comprise a coolant supply channel configured to extend along a stacking direction of the module stack and communicate with a first vent on a first side of each of the plurality of battery modules; and a coolant collection channel configured to extend along the stacking direction of the module stack and communicate with a second vent on a second side of each of the plurality of battery modules.

The venting detector may be provided to an inner side of at least one of the coolant supply channel and the coolant collection channel.

The energy storage system may further comprise a first connection duct configured to connect the coolant supply channel to the first vent; and a second connection duct configured to connect the coolant collection channel to the second vent.

The venting detector may be provided to an inner side of at least one of the first connection duct and the second connection duct.

The coolant supply channel may have a coolant guide inclined downward from an inner surface of the coolant supply channel toward the first connection duct.

Advantageous Effects

According to an aspect of the present disclosure, when an abnormal heat generation occurs in some of the plurality of battery modules of the energy storage system, the gas may be rapidly discharged to the outside due to the increase of internal pressure of the battery module, and it is possible to quickly put a coolant into the battery module where the abnormal heat occurs by rapidly detecting the discharged gas.

As described above, due to the structure of the energy storage system according to the present disclosure, which may rapidly put a coolant into some battery modules, it is possible to prevent a thermal runaway phenomenon caused by the abnormal heat generated in some battery modules in advance, thereby preventing the thermal runaway phenomenon from propagating to the entire energy storage system.

DESCRIPTION OF DRAWINGS

The accompanying drawings illustrate a preferred embodiment of the present disclosure and together with the foregoing disclosure, serve to provide further understanding of the technical features of the present disclosure, and thus, the present disclosure is not construed as being limited to the drawing.

BEST MODE

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation. Therefore, the description proposed herein is just a preferable example for the purpose of illustrations only, not intended to limit the scope of the disclosure, so it should be understood that other equivalents and modifications could be made thereto without departing from the scope of the disclosure.

Figure 1:
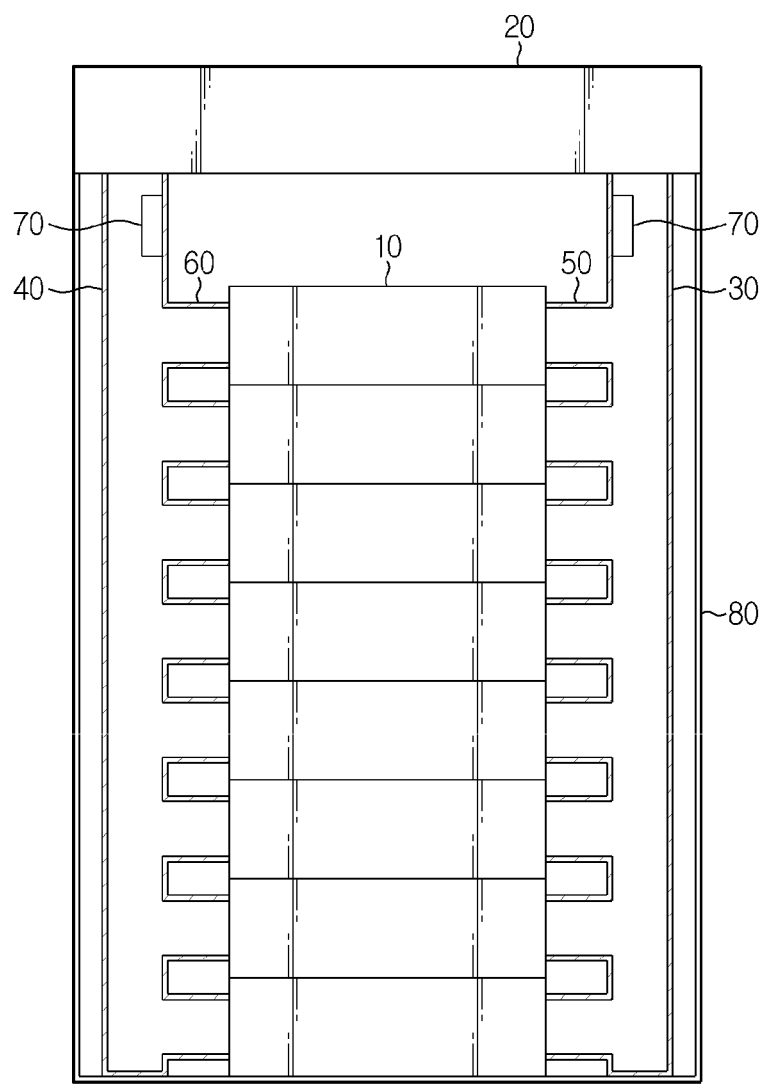
FIG. 1 is a diagram showing an energy storage system according to an embodiment of the present disclosure.

First, referring to FIG. 1, an energy storage system according to an embodiment of the present disclosure may be implemented to include a battery module 10, a coolant supplying unit 20, a coolant supply channel 30, a coolant collection channel 40, a first connection duct 50, a second connection duct 60, a venting detecting unit 70 and a housing 80.

Figure 2:
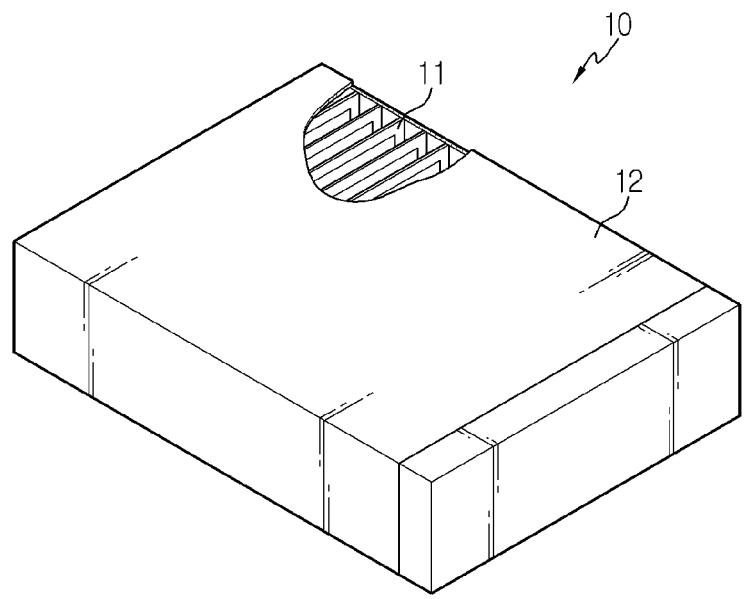
FIG. 2 is a diagram showing a battery module applied to the energy storage system according to an embodiment of the present disclosure.

The battery module 10 has a substantially rectangular parallelepiped shape and is provided in plural. The plurality of battery modules 10 are stacked vertically to form one module stack. Referring to FIG. 2, each battery module 10 includes a plurality of battery cells 11 and a module case 12 for accommodating the plurality of battery cells 11. As the battery cell 11, for example, a pouch-type battery cell may be applied.

Also, the plurality of battery cells 11 are stacked to face each other and accommodated in the module case 12 in a state of forming a single cell stack.

Figure 3:
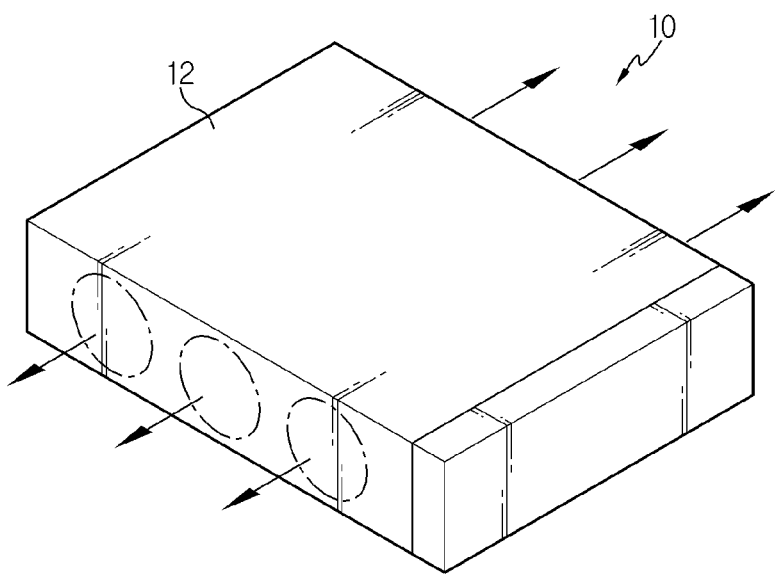
FIG. 3 is a diagram showing that gas is ejected to the outside to the increase of an internal pressure of the battery module depicted in FIG. 2.

As shown in FIG. 3, the module case 12 has a structure capable of discharging the gas generated therein when an internal pressure increases to a reference value or above due to an abnormal heat generation phenomenon of the battery module 10.

Figure 4:
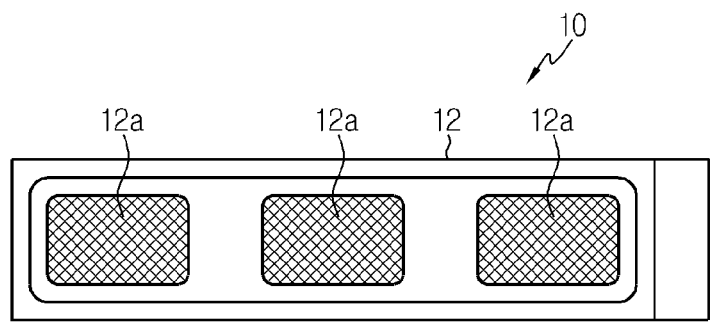
FIG. 4 is a diagram showing one side of the battery module depicted in FIG. 2 at which a venting portion is formed.
Figure 5:
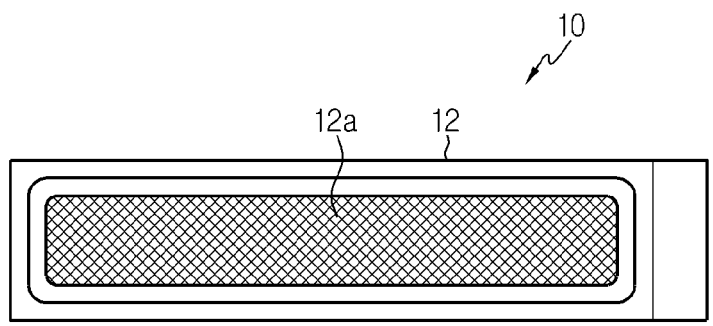
FIG. 5 is a diagram showing a modified example of the venting portion depicted in FIG. 4.

Specifically, referring to FIGS. 4 and 5, venting portions 12a are provided to one side and the other side of the module case 12. When an abnormal heat is generated in the battery module 10 and thus the pressure inside the battery module 10 increases to a reference value or above, which is set in consideration of safety, the venting portion 12a is ruptured so that the gas generated inside the battery module 10 is discharged to the outside.

Although not specifically shown in the figures, the battery cells 11 accommodated inside the module case 12 have a form in which an electrode assembly is accommodated in a cell case, and an electrolyte is accommodated in the cell case. If the battery cell is overheated due to the occurrence of a short circuit or the like, gas is generated inside the battery cell due to side reaction of the electrolyte. Also, if the internal pressure generated by the gas exceeds a certain level, the gas is discharged out of the cell case through a portion of the cell case where the sealing is weak.

As the amount of gas discharged out of the cell case increases, the pressure inside the module case 12 increases. If the internal pressure exceeds a reference value, the venting portion 12a, which is a weaker part than the surroundings, is ruptured so that the gas is discharged out of the module case 12.

The venting portion 12a must be rapidly ruptured under a high temperature condition, and considering this function, the venting portion 12a may be made of a resin film with a smaller thickness than the surroundings. The thickness of the resin film and the type of resin applied to the resin film may be determined such that the venting portion 12a is melted and completely rupture at a temperature of approximately 100° C. to 300° C.

The venting portion 12a is formed on each of one side and the other side of the module case 12, and a plurality of venting portions 12a may be discontinuously formed along a longitudinal direction of the module case 12 (a left and right direction based on FIG. 4) as shown in FIG. 4.

In addition, as shown in FIG. 5, only one venting portion 12a may be formed at each of one side and the other side of the module case 12 to extend in the longitudinal direction of the module case 12 (the left and right direction based on FIG. 5).

Referring to FIG. 1, the coolant supplying unit 20 is provided to an upper portion of the module stack, and if venting of some battery modules 10 is detected by the venting detecting unit 70, the coolant is supplied into the battery modules 10 where the venting occurs, to prevent the temperature of the battery modules 10 from rising.

As described above, the coolant supplying unit 20 may prevent the thermal runaway phenomenon initiated at the battery modules 10 causing an abnormal ignition from spreading to the entire module stack by directly supplying a coolant into the battery modules 10, subject to the occurrence of venting at some battery modules 10.

As the coolant supplied through the coolant supplying unit 20, a liquid or gas coolant may be used. Considering that the coolant supplying unit 20 is located at the upper portion of the module stack, it may be more beneficial to use a liquid coolant for rapid coolant supply by free fall.

The coolant supplying unit 20 may have a driving device such as a pumping motor therein for supplying and recovering the coolant, and the coolant circulates more quickly by driving the driving device to rapidly cool the battery modules 10 where an event has occurred.

Figure 6:
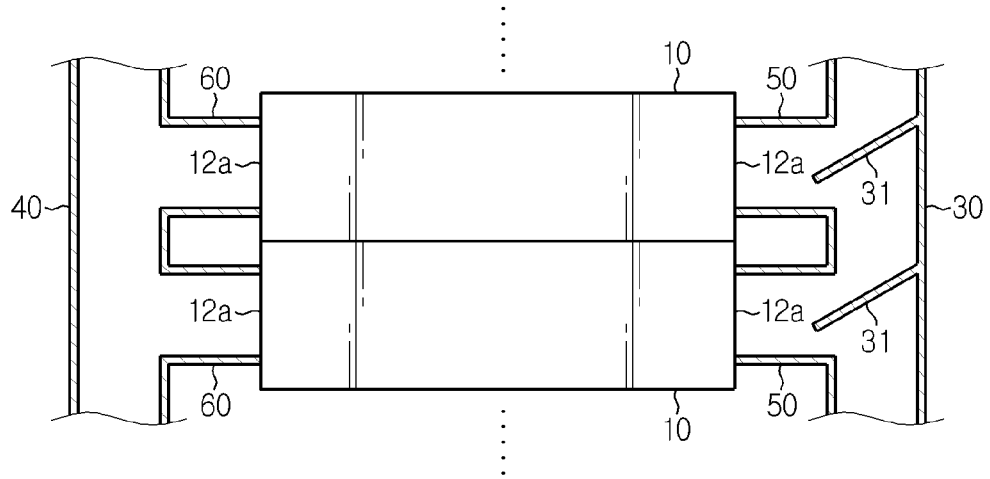
FIG. 6 is a diagram showing a portion of the energy storage system of FIG. 1 according to an embodiment of the present disclosure.

Referring to FIGS. 1 and 6, the coolant supply channel 30 has a shape extending along the stacking direction of the battery modules 10 and communicates with the venting portion 12a provided to one side of the battery modules 10. In addition, the coolant collection channel 40 has a shape extending along the stacking direction of the battery modules 10 and communicates with the venting portion 12a provided to the other side of the battery modules 10.

The first connection duct 50 connects the coolant supply channel 30 to the venting portion 12a provided to one side of the battery module 10. In addition, the second connection duct 60 connects the coolant collection channel 40 to the venting portion 12a provided to the other side of the battery module 10.

That is, if it is detected that venting occurs at some battery modules 10, the energy storage system according to an embodiment of the present disclosure supplies the coolant through the coolant supplying unit 20, and the supplied coolant moves downward along the coolant supply channel 30 and flows into the battery module 10 where venting occurs through the first connection duct 50. In addition, the coolant flowing into the battery module 10 through the ruptured venting portion 12a cools the inside of the battery module 10 and then exits toward the coolant collection channel 40 through the second connection duct 60.

The coolant that cools the battery module 10 and exits toward the coolant collection channel 40 moves upward and/or downward along the coolant collection channel 40. If the coolant is fully filled in the coolant collection channel 40, the coolant is recovered to the coolant supplying unit 20.

Figure 7:
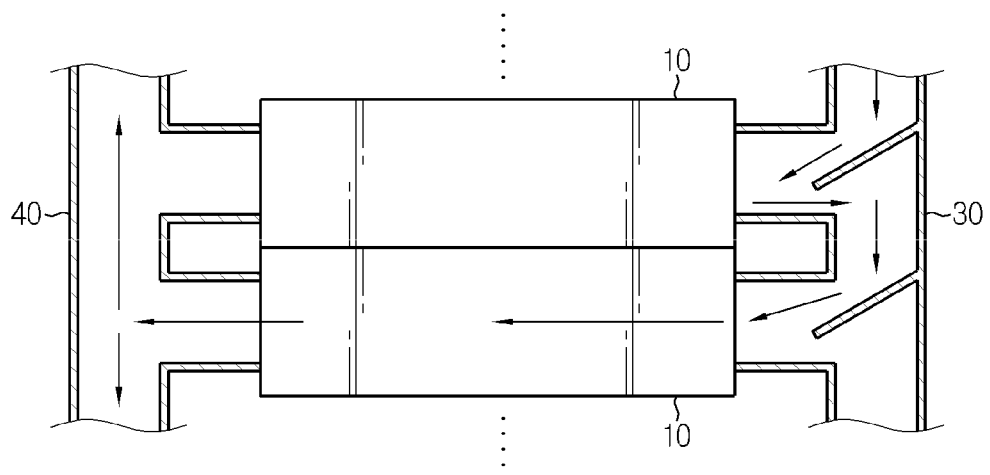
FIG. 7 is a diagram showing a moving path of a coolant when a venting is generated in some battery modules in the energy storage system depicted in FIG. 6.

Referring to FIG. 7, the coolant supply channel 30 may have a coolant guide 31 inclined downward toward the first connection duct 50 from the inner surface of the coolant supply channel 30. The coolant guide 31 allows the coolant moving from the upper side to the lower side along the coolant supply channel 30 to more easily move toward the first connection duct 50.

Figure 8:
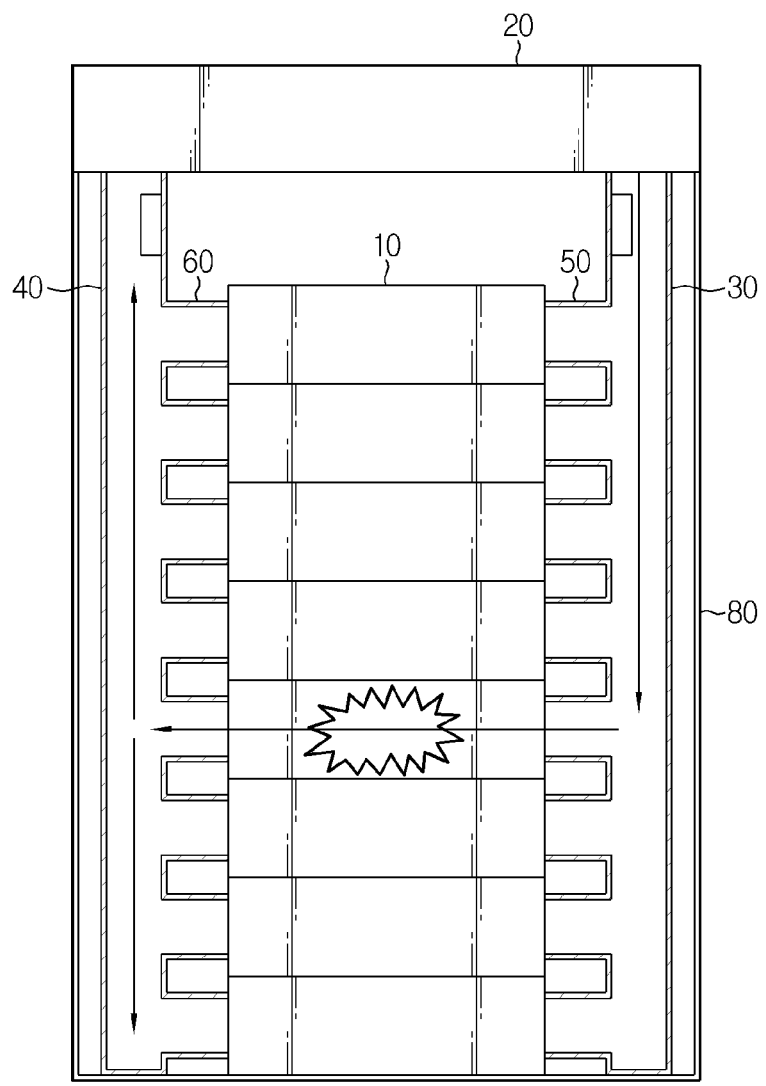
FIG. 8 is a diagram showing a moving path of a coolant when a venting is generated in some battery modules in the energy storage system depicted in FIG. 1.

As described above, since the energy storage system according to an embodiment of the present disclosure includes the coolant supplying units 20, the channels 30, 40 and the ducts 50, 60, it is possible to form the flow of coolant as indicated by the arrow in FIG. 8. That is, in the energy storage system according to an embodiment of the present disclosure, if an event occurs in some battery modules 10 to discharge gas, the coolant circulates along the path of the coolant supplying unit 20, the coolant supply channel 30, the first connection duct 50, the battery module 10 where the event occurs, the second duct 60, the coolant collection channel 40 and the coolant supplying unit 20, thereby rapidly cooling the battery module 10.

Referring to FIG. 1 again, the venting detecting unit 70 detects a venting that occurs in at least some of the plurality of battery modules 10, and transmits the detection signal to the coolant supplying unit 20. The venting detecting unit 70 detects whether the venting occurs by detecting a gas discharged by the venting of the battery module 10. That is, the venting detecting unit 70 may be a sensor for detecting gas.

In order to detect the gas discharged by the venting generated at the battery module 10, the venting detecting unit 70 must be disposed on a closed circulation path through which the coolant circulates. Thus, the venting detecting unit 70 may be provided to the inside of the coolant supplying unit 20 and/or the inside of the coolant supply channel 30 and/or the inside of the coolant collection channel 40 and/or the inside of the first connection duct 50 and/or the inside of the second connection duct 60.

Considering both the cost reduction and the rapid detection of venting occurrence, it may be advantageous that the venting detecting unit 70 is provided to either the inside of the first connection duct 50 or the inside of the second connection duct 60.

Referring to FIG. 1, the housing 80 accommodates other components of the energy storage system according to an embodiment of the present disclosure as described above.

As described above, the energy storage system according to an embodiment of the present disclosure has a structure for quickly detecting an event such as an abnormal heat generated in some battery modules 10 and intensively putting a coolant into the battery modules 10 where the event is generated. Accordingly, it is possible to secure safety in use of the energy storage system by preventing the event generated in some battery module 10 from propagating to the entire module stack.

The present disclosure has been described in detail. However, it should be understood that the detailed description and specific examples, while indicating preferred embodiments of the disclosure, are given by way of illustration only, since various changes and modifications within the scope of the disclosure will become apparent to those skilled in the art from this detailed description.

What is claimed is:

1. An energy storage system, comprising:
   a module stack having a plurality of battery modules;
   a venting detector configured to detect a venting of discharged gas from at least one of the plurality of battery modules; and
   a coolant supplier configured to supply a coolant to the at least one battery module at which the venting of discharged gas occurs in response to the venting of the discharged gas being detected by the venting detector,
   wherein the coolant is a liquid coolant,
   wherein the plurality of battery modules are stacked vertically in a housing, and
   wherein guides extend toward the plurality of battery modules respectively to direct the coolant toward the plurality of battery modules,
   wherein each of the plurality of battery modules includes a module case, and
   wherein each module case has a vent in a side of the module case facing the guides.

2. The energy storage system according to claim 1, wherein the venting detector is provided inside the coolant supplier.

3. The energy storage system according to claim 1, wherein each of the plurality of battery modules includes:
   a plurality of battery cells; and
   a module case configured to accommodate the plurality of battery cells.

4. The energy storage system according to claim 3, wherein the module case has a vent that is ruptured according to an increase of an internal pressure of the battery module to discharge an internal gas.

5. The energy storage system according to claim 4, wherein the vent is a resin film that is melted at a reference temperature or above.

6. The energy storage system according to claim 4, further comprising:
   a coolant supply channel configured to extend along a stacking direction of the module stack and communicate with a first vent on a first side of each of the plurality of battery modules; and
   a coolant collection channel configured to extend along the stacking direction of the module stack and communicate with a second vent on a second side of each of the plurality of battery modules.

7. The energy storage system according to claim 6, wherein the venting detector is provided to an inner side of at least one of the coolant supply channel and the coolant collection channel.

8. The energy storage system according to claim 6, further comprising:

a first connection duct configured to connect the coolant supply channel to the first vent; and a second connection duct configured to connect the coolant collection channel to the second vent.

9. The energy storage system according to claim 8, wherein the venting detector is provided to an inner side of at least one of the first connection duct and the second connection duct.

10. The energy storage system according to claim 8, wherein the coolant supply channel has a coolant guide inclined downward from an inner surface of the coolant supply channel toward the first connection duct.

11. The energy storage system according to claim 1, wherein the venting detector is a sensor for detecting gas escaping from a rupture in a vent in a module case of the at least one battery module.

12. The energy storage system according to claim 1, wherein the venting detector is located above the module stack.

13. The energy storage system according to claim 1, wherein the venting detector is spaced from the module stack.

14. The energy storage system according to claim 4, wherein the vent melts and completely ruptures at a temperature of approximately 100° C. to 300° C.

15. The energy storage system according to claim 4, wherein the vent comprises three vents on each side of the module case.

16. The energy storage system according to claim 8, wherein the coolant supply channel has a plurality of coolant guides inclined downward from an inner surface of the coolant supply channel, and wherein a number of the plurality of coolant guides equals a number of the plurality of battery modules.

17. The energy storage system according to claim 1, wherein the coolant supplier is above the plurality of battery modules.

* * * * *